(12) United States Patent
Ivakhnenko

(10) Patent No.: US 11,107,085 B2
(45) Date of Patent: Aug. 31, 2021

(54) SYSTEM AND METHOD FOR FRAUD DETECTION

(71) Applicant: ACI WORLDWIDE CORPORATION, Elkhorn, NE (US)

(72) Inventor: Vladimir Ivakhnenko, Elkhorn, NE (US)

(73) Assignee: ACI Worldwide Corporation, Elkhorn, NE (US)

( * ) Notice: Subject to any disclaimer, the term of this patent is extended or adjusted under 35 U.S.C. 154(b) by 56 days.

(21) Appl. No.: 16/745,003

(22) Filed: Jan. 16, 2020

(65) Prior Publication Data
US 2021/0224809 A1    Jul. 22, 2021

(51) Int. Cl.
| | |
|---|---|
| *G06Q 20/40* | (2012.01) |
| *G06N 20/00* | (2019.01) |
| *G06F 16/23* | (2019.01) |
| *G06F 16/28* | (2019.01) |
| *G06Q 40/02* | (2012.01) |

(52) U.S. Cl.
CPC ..... *G06Q 20/4016* (2013.01); *G06F 16/2379* (2019.01); *G06F 16/285* (2019.01); *G06N 20/00* (2019.01); *G06Q 40/02* (2013.01)

(58) Field of Classification Search
CPC .......... G06Q 20/4016; G06Q 16/3279; G06Q 16/285
See application file for complete search history.

(56) References Cited

U.S. PATENT DOCUMENTS

| | | | |
|---|---|---|---|
| 2015/0170148 A1* | 6/2015 | Priebatsch | G06Q 20/4016 705/44 |
| 2019/0236609 A1* | 8/2019 | Li | G06N 5/046 |
| 2019/0333035 A1* | 10/2019 | Hegge | G06Q 20/02 |

* cited by examiner

*Primary Examiner* — Scott C Anderson
(74) *Attorney, Agent, or Firm* — Hovey Williams LLP

(57) ABSTRACT

A system and method for detecting fraudulent transactions of incremental transactions via incrementally training classifiers on a number of data subsets to obtain transaction label predictions. Recent information on fraudulent transactions is implemented to update the classifiers, thereby eliminating the problems of concept drift and verification latency. Some of the incremental transactions may be labeled as fraudulent according to the incrementally modified classifiers and thereby rejected.

13 Claims, 4 Drawing Sheets

SYSTEM AND METHOD FOR FRAUD DETECTION

BACKGROUND

Detecting fraudulent transactions has become more difficult due to the increasing volume of online transactions, the relatively small distribution of fraudulent transactions, and the evolution of fraudulent transactions and good transactions (known as concept drift) due to transaction seasonality, changes in malicious customer attack strategies, and changes in good customer behavior.

Fraud detection companies and financial institutions often rely on software products that apply supervised and/or unsupervised machine learning algorithms to detect fraudulent transactions. Unsupervised methods are based on outlier/anomaly detection techniques that consider any nonconforming transaction as fraudulent. Supervised algorithms such as Neural Networks, Random Forest, XGBoost, Naïve Bayes, Support Vector Machine (SVM), and Logistic Regression provide higher fraud detection performance than unsupervised algorithms, but they require assigning labels (e.g., "G" for a good transaction and "F" for a fraudulent transaction) to each transaction record used in model classifier training. Unfortunately, both strategies train model classifiers on labeled historical data and thus ignore concept drift and verification latency. As such, their fraud detection performance suffers over time. Furthermore, without being checked by investigators on a timely basis, the true nature (i.e., "class") of most transactions is usually only revealed a few days or even weeks after transactions actually take place, making it difficult to effectively train model classifiers.

This background discussion is intended to provide information related to the present invention which is not necessarily prior art.

SUMMARY

Embodiments of the present invention solve the above-described and other problems by providing a system and computer-implemented method for detecting fraudulent transactions using classifiers incrementally trained via oracle prediction paradigms.

An embodiment of the present invention provides a system for incrementally training classifiers corresponding to different learning algorithms on a number of data subsets to obtain transaction label predictions. Specifically, the system includes an electronic memory element containing a database storing an initial dataset corresponding to a number of initial transactions and a number of incremental datasets each corresponding to a number of incremental transactions. The system further includes a processor configured to incrementally apply at least two classifiers based on the initial datasets to the incremental transactions of the incremental datasets, with each classifier corresponding to a different learning algorithm. The processor incrementally builds at least two subsets per incremental dataset, with each subset including a number of transaction labels according to the application of one of the classifiers. The processor incrementally modifies the classifiers by applying one of the different learning algorithms not corresponding to the classifier being modified to the at least two subsets such that each classifier is updated via a learning algorithm corresponding to another one of the at least two classifiers. The processor labels some of the incremental transactions as fraudulent according to the incrementally modified classifiers and thereby rejects the fraudulent-labeled transactions.

Another embodiment of the present invention provides a computer-implemented method for incrementally training classifiers corresponding to different learning algorithms on a number of data subsets to obtain transaction label predictions. Specifically, the computer-implemented method may include the following steps performed by a transaction monitoring software application stored on and executed by a computer. First, an initial dataset corresponding to a number of initial transactions and a number of incremental datasets each corresponding to a number of incremental transactions is received. At least two classifiers based on the initial datasets are incrementally applied to the incremental transactions of the incremental datasets, with each classifier corresponding to a different learning algorithm. At least two subsets per incremental dataset are incrementally built, with each subset including a number of transaction labels according to the application of one of the classifiers. The classifiers are incrementally modified by applying one of the different learning algorithms not corresponding to the classifier being modified to the at least two subsets such that each classifier is updated via a learning algorithm corresponding to another one of the at least two classifiers. Some of the incremental transactions may be labeled as fraudulent according to the incrementally modified classifiers and thereby rejected.

Yet another embodiment of the present invention provides a system for incrementally training classifiers on a number of separate data subsets to obtain transaction label predictions. Specifically, the system includes an electronic memory element containing a database storing an initial dataset corresponding to a number of initial transactions and a number of incremental datasets corresponding to a number of incremental transactions. The system further includes a processor configured to divide the initial dataset into at least two subsets and divide each of the incremental datasets into at least two subsets. The processor applies a learning algorithm to a first one of the at least two subsets of the initial dataset so as to build a first classifier. Similarly, the processor applies the learning algorithm to a second one of the at least tow subsets of the initial dataset so as to build a second classifier. The processor incrementally applies the first classifier to a second one of the at least two subsets of each of the incremental datasets and incrementally applies the second classifier to a first one of the at least two subsets of each of the incremental datasets. The processor incrementally modifies the classifiers by applying the learning algorithm to transactions of the first one of the at least two subsets to update the first classifier and applying the learning algorithm to transactions of the second one of the at least two subsets to update the second classifier. The processor may label some of the incremental transactions as fraudulent according to the incrementally modified classifiers and thereby reject the fraudulent-labeled transactions.

Yet another embodiment of the present invention provides a computer-implemented method is provided for incrementally training classifiers on a number of separate data subsets to obtain transaction label predictions. Specifically, the computer-implemented method may include the following steps performed by a transaction monitoring software application stored on and executed by a computer. First, an initial dataset corresponding to a number of initial transactions and a number of incremental datasets each corresponding to a number of incremental transactions is received. The initial dataset is divided into at least two subsets and each of the incremental datasets is divided into at least two subsets. A learning algorithm is applied to a first one of the at least two subsets of the initial dataset so as to build a first classifier. Similarly, the learning algorithm is applied to a second one of the at least two subsets of the initial dataset so as to build a second classifier. The first classifier is incrementally applied to a second one of the at least two subsets of each of the incremental datasets, and the second classifier is incrementally applied to a first one of the at least two subsets of each incremental datasets. The classifiers are incrementally modified by applying the learning algorithm to transactions of the first one of the at least two subsets to update the first classifier and applying the learning algorithm to transactions of the second one of the at least two subsets to update the second classifier. Some of the incremental transactions may be labeled as fraudulent according to the incrementally modified classifiers and thereby rejected.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

The present invention provides a system and computer-implemented methods for detecting fraudulent transactions. Machine learning systems employing data driven models provide a framework for monitoring transactions, but the ability to detect fraudulent transactions diminishes quickly. Embodiments of the present invention provide fraudulent transaction detection solutions for effectively addressing this problem.

Figure 1:
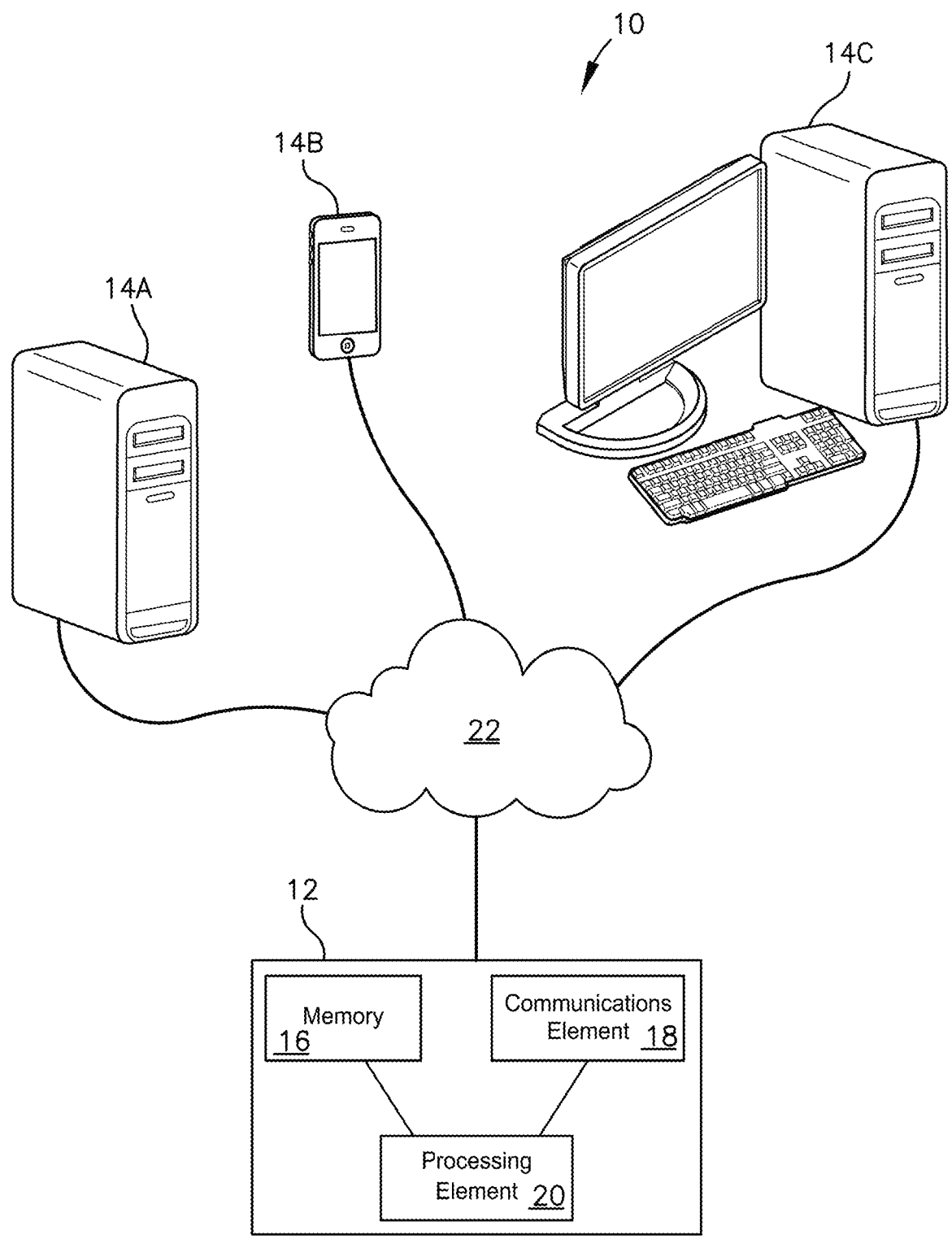
FIG. 1 is a schematic diagram of a fraudulent transaction detection system constructed in accordance with an embodiment of the invention.

Referring to FIG. 1, a system 10 in accordance with an embodiment of the invention is shown for using classifiers incrementally trained via oracle prediction to detect fraudulent transactions. The system 10 broadly comprises a computing device 12 and a plurality of remote computing devices 14A-C.

The computing device 12 includes an electronic memory element 16, an electronic communications element 18, and a processing element 20. The computing device 12 may be any suitable computing device configured to implement an embodiment of the present technology, especially incrementally updating learning algorithm classifiers and applying the updated learning algorithm classifiers to transaction entries of incremental datasets as discussed in more detail below.

The electronic memory element 16 may be any computer-readable non-transitory medium that can store a program for use by or in connection with an instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The electronic communications element 18 allows the processing element 20 to communicate with the remote computing devices 14A-C or other electronic devices via a communications network 22. The electronic communications element 18 may include signal or data transmitting and receiving circuits, such as antennas, amplifiers, filters, mixers, oscillators, digital signal processors (DSPs), and the like.

The processing element 20 may include electronic hardware components such as processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 20 may generally execute, process, or run instructions, code, code segments, software, firmware, programs, applications, apps, processes, services, daemons, or the like. The processing element 20 may also include hardware components such as finite-state machines, sequential and combinational logic, and other electronic circuits that can perform the functions necessary for the operation of the current invention. The processing element 20 may be in communication with the remote computing devices 14A-C via a wired or wireless communications network.

The remote computing devices 14A-C may be servers, off-site storage units acting as data repositories or cloud computing devices, desktop computers, personal computing devices, and the like. The remote computing devices 14A-C may also include additional or parallel computing devices for detecting fraudulent transactions in different geographical regions, marketplaces, or the like.

Incremental Learning

Figure 2:
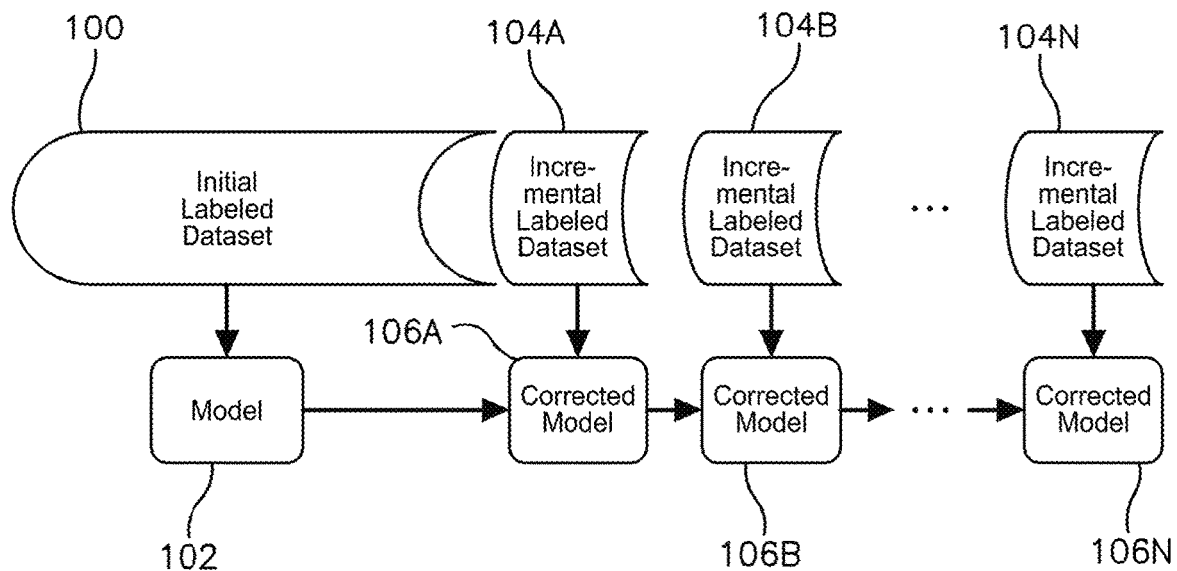
FIG. 2 is a flowchart depicting an exemplary incremental learning paradigm implemented in embodiments of the invention.

Embodiments of the present invention are implemented in an incremental learning paradigm, as shown in FIG. 2. An initial dataset 100 is based on historical "aged" transactions such that each entry (e.g., row) of the initial dataset 100 corresponds to a single transaction and has either a "G" (i.e., good) or an "F" (i.e., fraudulent) label assigned to it (i.e., each transaction is fully labeled). Each column of the initial dataset 100 represents a feature either obtained from raw transactions or produced by a feature engineering process. A model 102 having hyperparameters and updatable parameters is built on the initial dataset 100. Optimal values of the hyperparameters are determined via the initial dataset 100.

Incremental datasets 104A-N correspond to incremental transactions following the initial transactions of the initial dataset 100. The incremental transactions are partially labeled and are split by either a time interval or a number of detected fraudulent transactions. In one embodiment, the incremental datasets 104A-N are divided by daily time intervals. Each incremental dataset 104A-N has the same set of features as the initial dataset 100. Incremental datasets 104A-N contain recent transactions (up to the current date), whereby fraudulent transactions are partially labeled and good transactions may be unlabeled at all. Some transactions not labeled as fraudulent may be labeled as fraudulent later. The updatable parameters of the model 102 are then incrementally updated according to the incremental datasets 104A-N to obtain incrementally corrected models 106A-N.

Online Learning Algorithms

Figure 3:
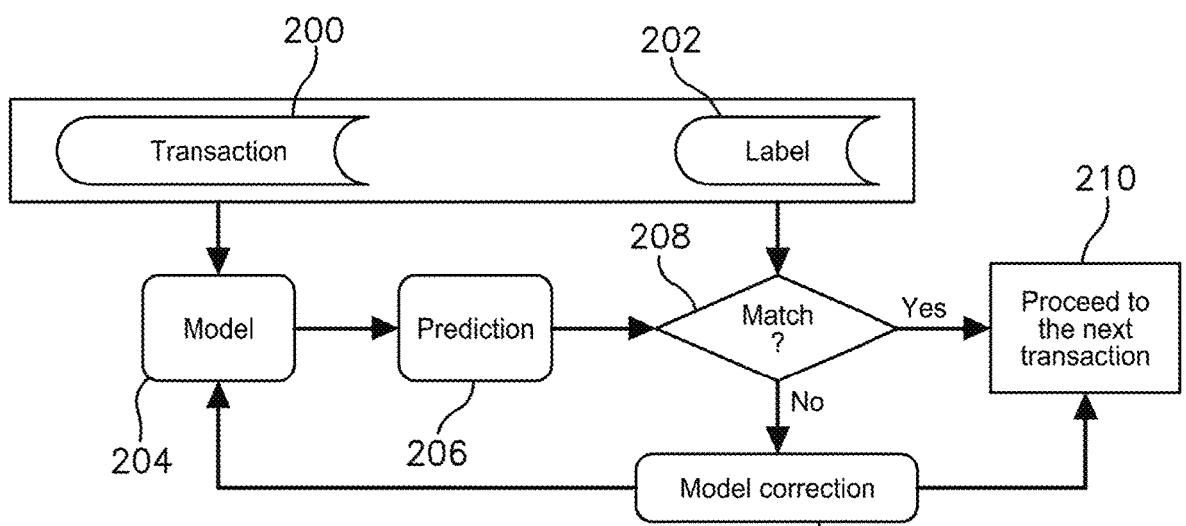
FIG. 3 is a flowchart depicting an exemplary online learning algorithm implemented in embodiments of the invention.

Embodiments of the present invention employ online learning algorithms, as shown in FIG. 3. Based on a previously-built model 204, an online learning algorithm predicts a class for a current transaction 200, as shown in block 206. The online learning algorithm compares the predicted class to a label 202 assigned to the current transaction, as shown in block 208. If the prediction matches the label 202, the online learning algorithm proceeds to the next transaction, as shown in block 210. Otherwise, the online learning algorithm corrects parameters of the model 204, as shown in block 212. The online learning algorithm then proceeds to the next transaction, as shown in block 210.

Dual Learning Algorithm Embodiment

Figure 4:
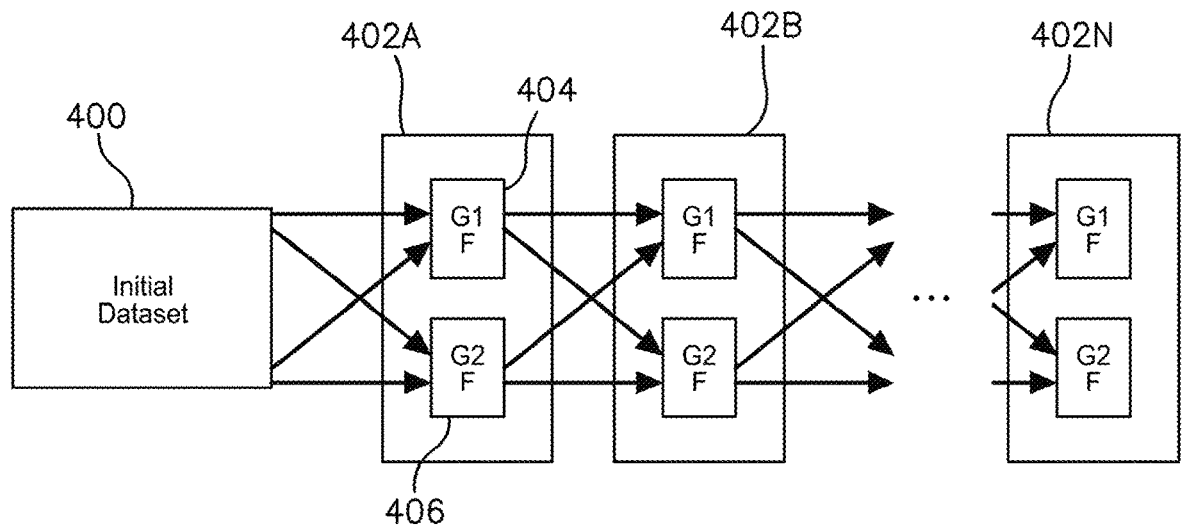
FIG. 4 is a flowchart of a first oracle prediction paradigm in accordance with another embodiment of the invention.
Figure 5:
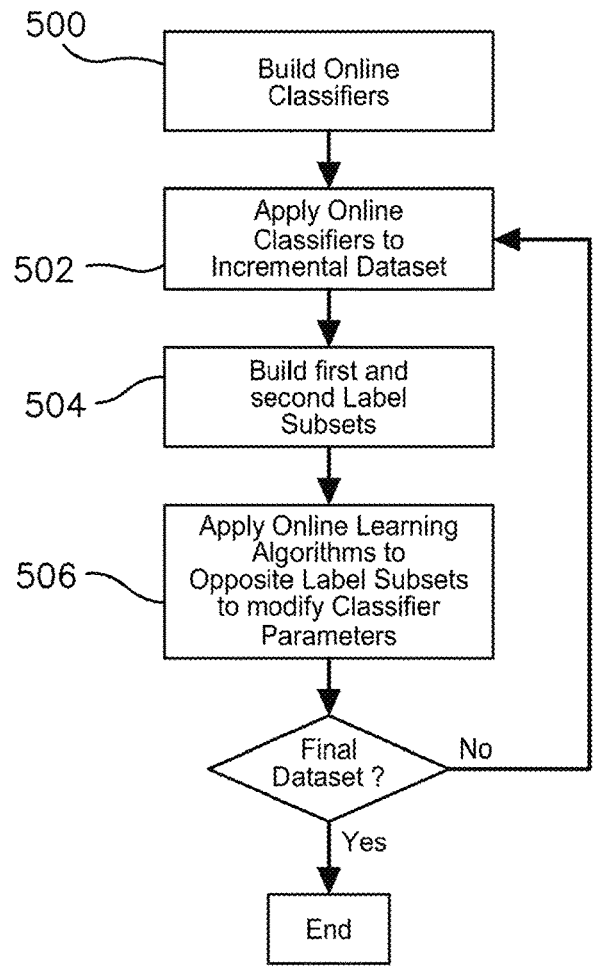
FIG. 5 is a block diagram including certain method steps for implementing the oracle prediction paradigm of FIG. 4.

Turning to FIG. 5, and with reference to FIG. 4, a method of fraudulent transaction detection employs first and second learning algorithms to update a fraudulent transaction prediction model. First, a first online classifier and a second online classifier are built on an initial dataset 400 corresponding to initial transactions, as shown in block 500. The initial transactions are fully labeled as either good or fraudulent. The first online classifier may correspond to a first online learning algorithm (e.g., Fourier Online Gradient Descent (FOGD)) and the second online classifier may correspond to a second online learning algorithm (e.g., Approximated Vector Machines (AVM)). For example, the first online classifier may be a FOGD classifier and the second online classifier may be an AVM classifier.

The first online classifier and the second online classifier are applied to incremental transactions of a first incremental dataset 402A to predict labels for the incremental transactions of the first incremental dataset 402A, as shown in block 502 and as represented by the crossing arrows of FIG. 4. This produces first and second sets of "G"-labeled transaction indices (i.e., sets G1 and G2). Specifically, the first online classifier is used to produce the first set G1. The second online classifier is used to produce the second set G2. The first online classifier and the second online classifier usually produce different sets because they are different from each other. Another set containing indices of partial "F"-labeled transactions in the incremental dataset is also denoted as set F.

First and second label subsets 404, 406 are then built from the first incremental dataset, as shown in block 504. The first label subset 404 may be denoted [G1, F] and the second label subset 406 may be denoted [G2, F].

The second online learning algorithm may then be applied to transactions corresponding to the first label subset 404 to modify parameters of the second online classifier, as shown in block 506 and as represented by the horizontal arrows of FIG. 4. The first online learning algorithm may also be applied to transactions corresponding to the second label subset 406 to modify parameters of the first online classifier.

The above steps may be incrementally implemented for subsequent incremental datasets 402B-N. In one embodiment, only one of the online classifiers is used to build a final updated model. Nevertheless, both the first online classifier and the second online classifier are updated for relevant label predictions.

Dual Dataset Embodiment

Figure 6:
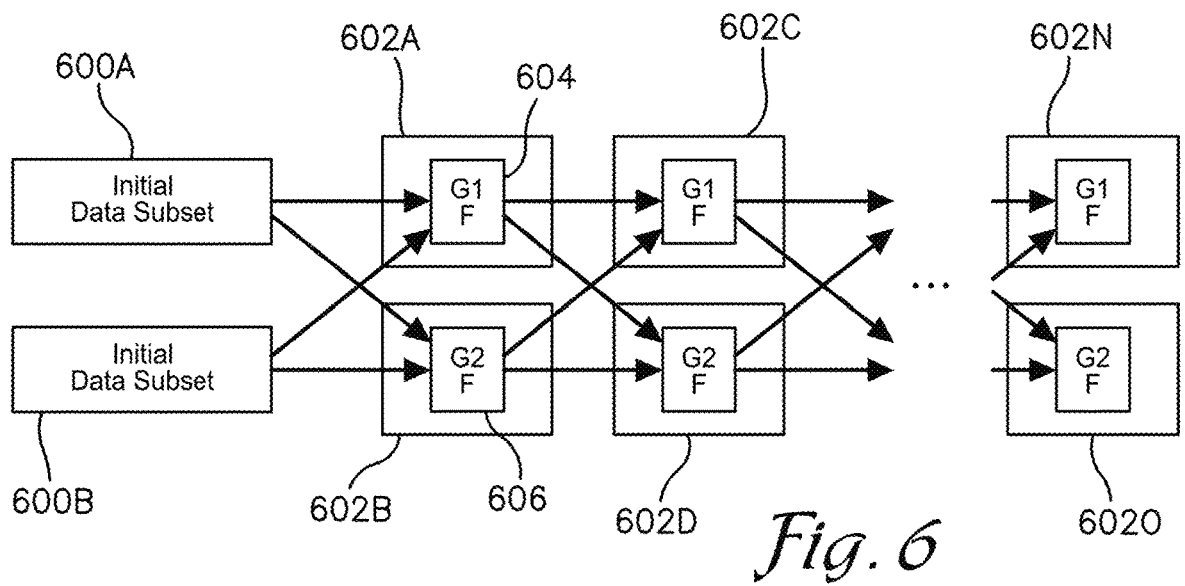
FIG. 6 is a flowchart of a second oracle prediction paradigm in accordance with another embodiment of the invention.
Figure 7:
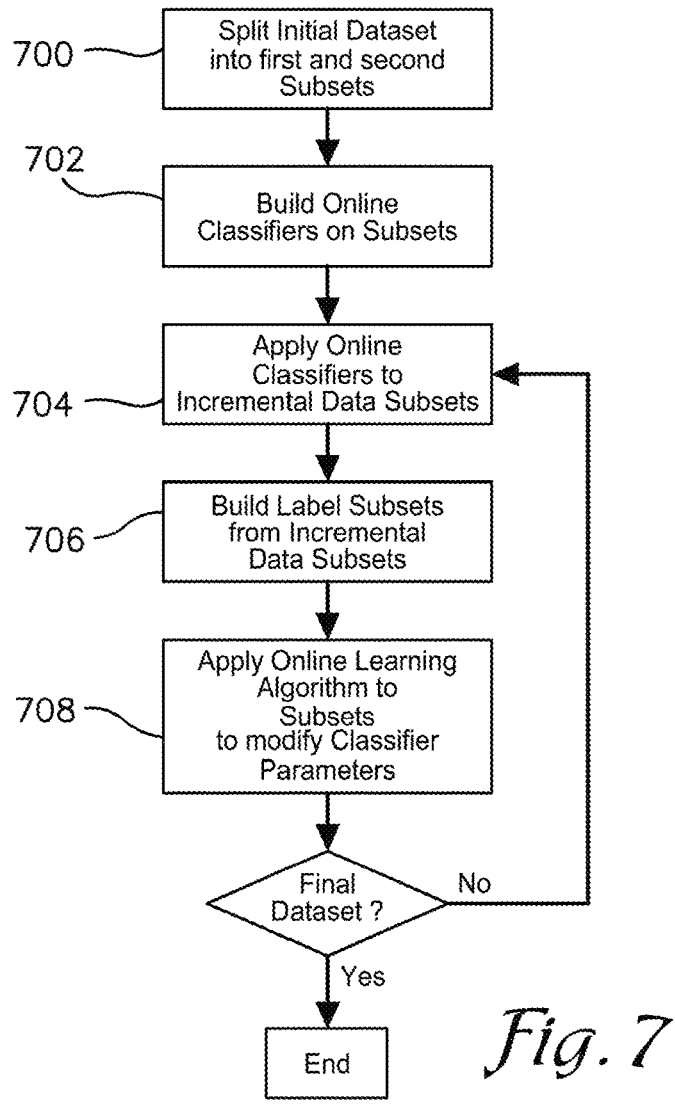
FIG. 7 is a block diagram including certain method steps for implementing the oracle prediction paradigm of FIG. 6.

Turning to FIG. 7 and with reference to FIG. 6, another method of fraudulent transaction detection employs separate data subsets to update a fraudulent transaction prediction model. First, an initial dataset is split into first and second initial data subsets 600A,B, as shown in block 700. The first initial data subset 600A includes half of a totality of good transactions and a totality of fraudulent transactions. Meanwhile, the second initial data subset 600B includes the other half of the totality of good transactions and the totality of fraudulent transactions. Incremental datasets may also be split into first and second data subsets 602A-O.

A first online classifier may be built on the first initial data subset 600A and a second online classifier may be built on the second initial data subset 600B, as shown in block 702. The first and second online classifiers are different from each other because they have been trained on different data subsets and optionally because they have different optimal values of hyperparameters.

The first online classifier is then applied to the second incremental data subset 602B to predict labels for the second incremental data subset 602B, as shown in block 704 and as represented by the crossing arrows of FIG. 6. The second online classifier may also be applied to the first incremental data subset 602A to predict labels for the first incremental data subset 602A. This produces first and second sets of "G"-labeled transaction indices (i.e., sets G1 and G2). Specifically, the first online classifier is used to produce the second set G2. The second online classifier is used to produce the first set G1.

First and second label subsets 604, 606 are then built from the first and second incremental data subsets 602A,B, as shown in block 706. The first label subset 604 may be denoted [G1, F]. The second label subset 606 may be denoted [G2, F].

An online learning algorithm may then be applied to transactions defined by the first label subset 604 to modify parameters of the first online classifier, as shown in block 708 and as represented by the horizontal arrows of FIG. 6. The online learning algorithm may also be applied to transactions defined by the second label subset 606 to modify parameters of the second online classifier.

The above steps may be incrementally implemented for subsets of subsequent incremental datasets 602C-602O. In one embodiment, only one of the online classifiers is used to build a final updated model. Nevertheless, both the first online classifier and the second online classifier are updated for relevant label predictions.

The above methods may assume that both the initial dataset and the incremental datasets share the same set of features. For the initial dataset, it may be possible to choose the optimal set of features for fraud detection, but such set of features may not remain optimal for incremental datasets because of frequent changes fraudsters make in their tactics.

Example

An FOGD online algorithm was implemented via the Dual Dataset Embodiment to build and update classifiers clf1 and clf2. To estimate model scoring performance obtained by the incremental learning algorithm and to compare it to the scoring performance models, a "G" or "F" label for each transaction was assigned for each transaction in the incremental datasets.

Two static models Random Forest (RF) and Kernel Approximation SVM (KA-SVM) were considered for comparison. To build static models, the initial dataset was split into training, validation, and test sets (60%/20%/20%), the model was trained on the training set and its hyperparameters were tuned using the validation set. Scoring results were calculated for training, validation, and test sets. However, in case of static models, unbiased scoring estimation can only be obtained for the test set. To evaluate static model performance for incremental datasets, each incremental dataset was split into three subsets in the same proportion (60%/20%/20%) as the initial dataset and the scoring results were calculated for each subset.

To build incremental models, dataset infrastructure created for static models was used. The FOGD online algorithm was applied to create clf1 and clf2 for the initial training subset. Since the online learning algorithm provided scoring before the transaction label was revealed and parameters of the model were modified, the scoring results for the training were considered unbiased and the same training set was used to determine the optimal values of the model hyperparameters.

After fixing the obtained optimal values of hyperparameters for clf1 and clf2, the incremental learning algorithm was applied to the sequences of the training, validation, and test incremental datasets. Classifier clf1 was chosen to calculate the scoring results for the incremental datasets. Although clf1 was built and modified for half of "G"-labeled transactions in the initial and incremental datasets, it was applied it to the whole "G"-labeled transactions in those datasets for scoring purposes. The incremental and static model results were also compared.

Scoring results of the incremental learning and static models applied for two datasets—Company A and Company B—were compared. For both sets the data was collected for a period of six months. For each transaction, information of the date and time it was committed was obtained. For each fraudulent transaction, information of the day of fraud detection was obtained. Data for the first month was processed to create a set of features. To explore the dependence of the model performance results on the period of time assigned for the initial dataset, two different time intervals were considered—three months and one month. One day time interval for the incremental datasets was assigned. To simulate production environment, fraudulent transactions were sorted by detection date before the incremental datasets were set up, while the date and time of the committed fraud were used to estimate the performance of the models. Percentage of fraud transactions detected (PFTD) as a function of time were observed.

For Company A's dataset, static models based on the RF algorithm provided a slightly better percentage of fraud transactions detected (PFTD) performance (for both the initial and incremental datasets) than the ones based on KA-SVM algorithm. Incremental learning models provided a lower PFTD performance for the initial datasets than static models. On the other hand, incremental learning models outperformed static models for the incremental datasets. A lower performance of incremental learning models for initial datasets can be attributed to the incremental learning algorithm property that only processes each transaction once while model training. For both initial and incremental datasets, static models built on a three month initial interval provided a higher PFTD performance than the corresponding ones built on a one-month initial interval. However, incremental learning models were almost insensitive to the time interval of the initial dataset. The feature set chosen for the initial dataset remains optimal for the incremental datasets and roughly the same performance (on average) were observed for both static models and a slightly improving performance for the incremental learning models.

For Company B's dataset, static models based on KA-SVM algorithm provided better PFTD performance (for both initial and incremental datasets) than the ones based on the RF algorithm. Incremental learning models provided lower PFTD performance on the initial datasets than static models. For the incremental datasets, the incremental learning models outperformed models based on the RF algorithm and provided average performance like the KA-SVM algorithm. Both the incremental learning and static models built on a three month initial interval did not provide higher PFTD performance for incremental datasets than corresponding ones built on a one month initial interval. For Company B's dataset, fraudsters changed their strategies significantly faster compared to Company A's dataset. As such, the feature set chosen for the initial dataset became irrelevant within a month after initial training and a drop in performance for all types of models resulted.

Advantages

The above-described systems and methods provide several advantages. For example, the present invention maintains incremental model detection performance as close as possible to the performance of the initial model at the moment of deployment. While the model keeps the information of the initial dataset, the model progressively updates itself by processing the information from incremental datasets. Furthermore, in case the feature set of incremental transactions remains optimal for the incremental datasets, the model's performance may also improve with time as additional incremental datasets are added.

Any online learning algorithm may be implemented for model correction. In most instances, an incremental learning algorithm, and in particular an FOGD-based incremental learning algorithm, used in parallel with static algorithms results in an optimal fraud detection model.

Additional Considerations

The description and drawings are illustrative and are not to be construed as limiting. Numerous specific details are described to provide a thorough understanding. However, in certain instances, well-known or conventional details are not described in order to avoid obscuring the description. References to one embodiment or an embodiment in the present disclosure are not necessarily references to the same embodiment; and, such references mean at least one.

The use of headings herein is merely provided for ease of reference, and shall not be interpreted in any way to limit this disclosure or the following claims.

References to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not for other embodiments. Unless excluded by explicit description and/or apparent incompatibility, any combination of various features described in this description is also included here.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for detecting a fraudulent transaction, the system comprising:
    an electronic memory element containing a database storing an initial dataset corresponding to a plurality of initial transactions and a plurality of incremental datasets each corresponding to a plurality of incremental transactions; and
    a processor configured to:
        incrementally apply at least two classifiers based on the initial datasets to the incremental transactions of the incremental datasets, each classifier corresponding to a different learning algorithm;
        incrementally build at least two subsets per incremental dataset, each subset including a plurality of labels according to application of one of the at least two classifiers;
        incrementally modify the at least two classifiers before applying the at least two classifiers to incremental transactions of subsequent incremental datasets by applying one of the different learning algorithms not corresponding to the classifier being modified to the at least two subsets such that each classifier is updated via a learning algorithm corresponding to another one of the at least two classifiers;
        apply a label indicating fraudulence to one of the incremental transactions via the incrementally modified classifiers and the learning algorithms; and
        reject the fraudulent-labeled incremental transaction.

2. The system of claim 1, wherein some of the plurality of labels indicate a good transaction and some of the plurality of labels indicate fraudulence.

3. The system of claim 1, wherein each of the plurality of initial transactions is assigned a label indicating a good transaction or a label indicating fraudulence.

4. The system of claim 1, wherein application of the at least two classifiers includes predicting labels for one of the plurality of incremental datasets so as to obtain two sets of good transaction labels.

5. The system of claim 1, wherein application of the at least two classifiers includes predicting labels for one of the plurality of incremental datasets so as to obtain a set of partial fraudulent transaction labels.

6. The system of claim 1, wherein only one of the at least two classifiers is used in a final iteration of classifier application.

7. The system of claim 1, wherein the at least two classifiers includes exactly two classifiers and the at least two subsets includes exactly two subsets.

8. A method of detecting fraudulent transactions, the method comprising the steps of:
    receiving an initial dataset corresponding to a plurality of initial transactions;
    receiving a plurality of incremental datasets each corresponding to a plurality of incremental transactions;
    applying at least two classifiers based on the initial datasets to the incremental transactions of the incremental datasets, each classifier corresponding to a different learning algorithm;
    building at least two subsets per incremental dataset, each subset including a plurality of labels according to application of one of the at least two classifiers;
    incrementally modifying the at least two classifiers before applying the at least two classifiers to incremental transactions of subsequent incremental datasets by applying one of the different learning algorithms not corresponding to the classifier being modified to the at least two subsets such that each classifier is updated via a learning algorithm corresponding to another one of the at least two classifiers;
    applying a label indicating fraudulence to one of the incremental transactions via the incrementally modified classifiers and the learning algorithms; and
    rejecting the fraudulent-labeled incremental transaction.

9. The method of claim 8, wherein the some of the plurality of labels indicate a good transaction and some of the plurality of labels indicate fraudulence.

10. The method of claim 8, further comprising the step of assigning a label indicating a good transaction or a label indicating fraudulence to each of the plurality of initial transactions.

11. The method of claim 8, wherein the step of applying the at least two classifiers includes predicting labels for one of the plurality of incremental datasets so as to obtain two sets of good transaction labels.

12. The method of claim 8, wherein the step of applying the at least two classifiers includes predicting labels for one of the plurality of incremental datasets so as to obtain a set of partial fraudulent transaction labels.

13. The method of claim 8, wherein only one of the at least two classifiers is used in a final iteration of classifier application.

* * * * *